April 2, 1935.  N. BONANNO  1,996,637
TABLE AND ENDLESS CONVEYER
Filed May 10, 1932  2 Sheets-Sheet 1
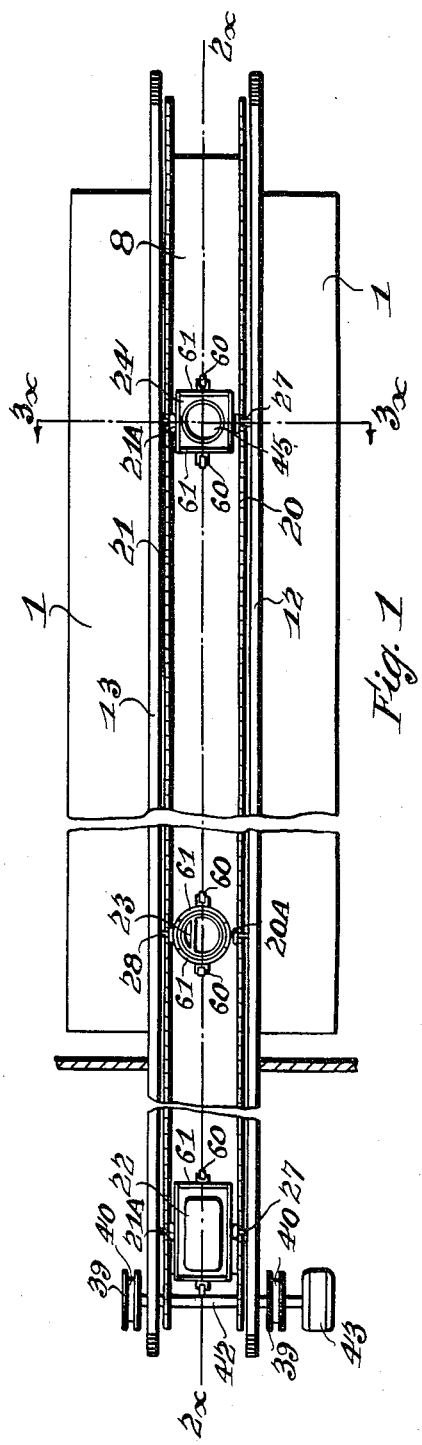
Fig. 1
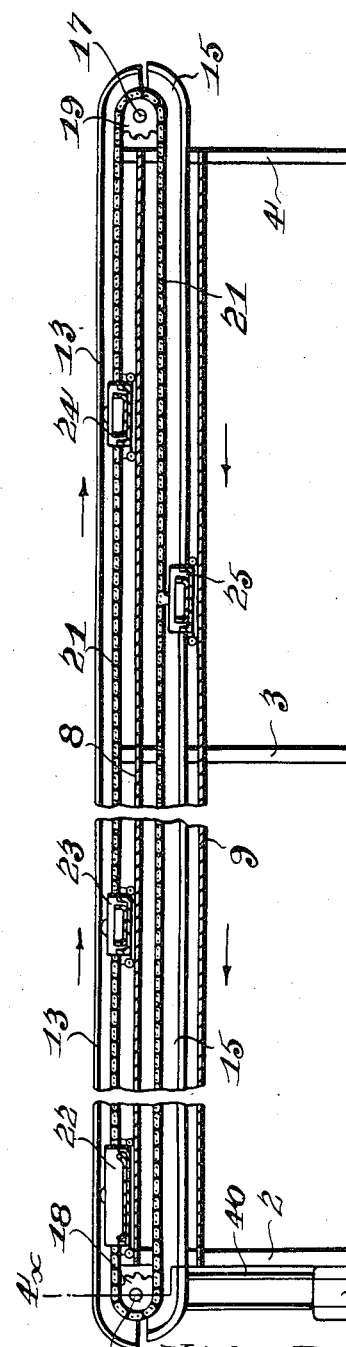
Fig. 2
Inventor
*Nick Bonanno*
By 
Attorney April 2, 1935.   N. BONANNO   1,996,637
TABLE AND ENDLESS CONVEYER
Filed May 10, 1932   2 Sheets-Sheet 2
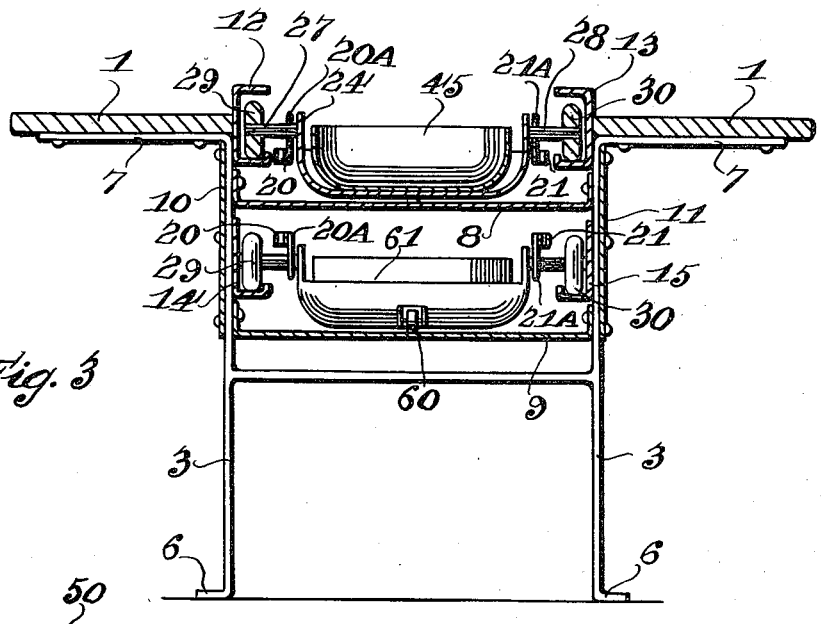
Fig. 3
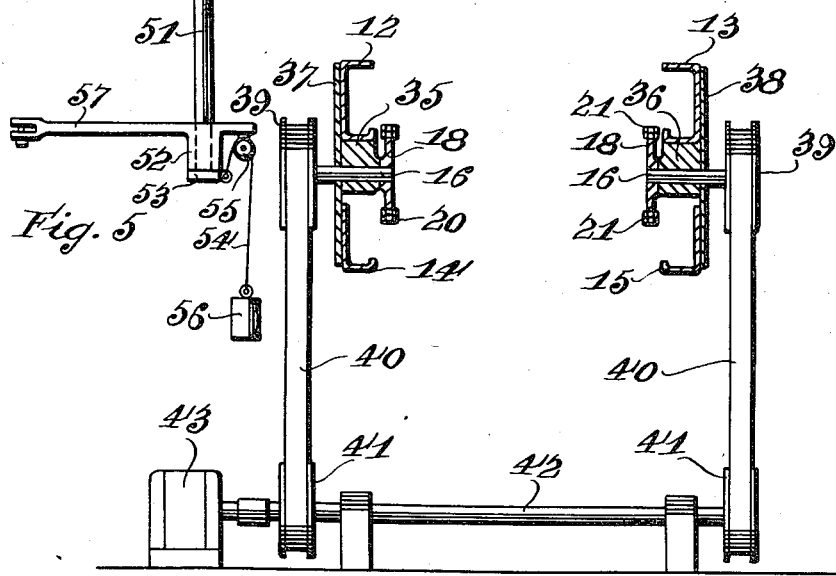
Fig. 5
Fig. 4
Inventor
Nick Bonanno
By Frank Keifer
Attorney

Patented Apr. 2, 1935

1,996,637

UNITED STATES PATENT OFFICE 1,996,637

TABLE AND ENDLESS CONVEYER

Nick Bonanno, Rochester, N. Y.

Application May 10, 1932, Serial No. 610,487

6 Claims. (Cl. 186—1)

The object of this invention is to provide a table with an endless conveyer as a part thereof, the endless conveyer being adapted to carry products from one end of the table to the other, or from the kitchen to the table, or from the kitchen throughout the length of the table.

Another object is to provide an endless conveyer that will carry products out and return them without upsetting or spilling them.

These and other objects of the invention will be illustrated in the drawings, described in the specification, and pointed out in the claims at the end thereof.

In the drawings:

Figure 1 is a top plan view of the table.

Figure 2 is a vertical section through the table on the line $2x\ 2x$ of Figure 1.

Figure 3 is a vertical section on the line $3x\ 3x$ of Figure 1.

Figure 4 is a vertical section on the line $4x\ 4x$ of Figure 2.

Figure 5 is a detail view of an elevator provided at one end of the table for a special purpose.

In the drawings like reference numerals indicate like parts.

In the drawings, reference numeral 1 indicates the table top, and 2, 3, and 4 indicate the table legs or supports. These legs are preferably of metal bars and are bent outwardly at the bottom to form feet 6, and are bent outwardly at the top to form brackets 7 on which the table tops 1, 1 may be attached. The legs or uprights are spaced apart by the braces or floors 8 and 9, each of which is in the shape of a pan which extends the whole length of the table. On the outside of the legs are fastened the upright cover plates 10 and 11, which protect the moving parts from interference from either side.

At the top of the table on each side are provided the channel-shaped runways or tracks 12 and 13, and below them are provided the L-shaped runways or tracks 14 and 15. At each end of the table are placed shafts 16, 16 and 17, 17 on which are carried sprocket wheels 18 and 19, on which travel the endless sprocket chains 20 and 21.

At suitable intervals are provided carriers of different shapes and sizes, such as are shown at 22, 23, 24 and 25. These carriers are made and supported so that by gravity they can remain in a horizontal position as they move forward or back, or up or down. Thus, as is shown in Figure 3, the carrier 24 is provided with trunnions 27 and 28, one on each side thereof, on the ends of which are carried wheels or rollers 29 and 30 that engage in and are supported by the channels 12 and 13 on the upper run, and by the runways 14 and 15 on the lower run. The carrier 24 is bowl-shaped and the trunnions are attached near the upper edge thereof, so that the carrier will maintain its horizontal position by gravity so long as it is free to swing on the trunnions. On the chains 20 and 21 are carried rings 20A and 21A through which the trunnions pass and by which the carriers are moved.

In the lower runway I have shown the carrier 25, which is also provided with trunnions 27 and 28, supported by rollers 29 and 30.

The sprocket chains run in the direction of the arrows shown in Figure 2.

As shown in Figure 4, bearings 35 and 36 are provided, which are supported by the channels 12 and 13. Plates 37 and 38 are also provided, which are supported from the channels 12 and 13 and the runways 14 and 15. In the bearings 35 and 36 are provided short shafts 16, 16 on which the sprocket wheels 18, 18 are carried. Each of these shafts is driven by a pulley 39, 39, which in turn are driven by belts 40, which in turn are driven from pulleys 41, 41 carried on the shaft 42 which is driven by a motor 43.

The operation of this device is as follows. The sprocket chain travels in the direction of the arrows shown in Figure 2, and the carriers 22, 23 and 24 move to the right along the table top. When they come to the sprocket wheel, the carriers follow the chain around the sprocket wheel, and for this purpose are guided by the ends of the runways 12 and 13 which are curved down, as shown at the ends of Figure 2, and they are also guided by the ends of the runways 14 and 15, which are curved up to receive the oncoming carrier. It will be seen that the receiving end of the runway 15 projects out beyond the discharge end of the runway 13 at the right of Figure 2, and the receiving end of the runway 13 projects out beyond the discharge end of the runway 15 at the left of Figure 2. This helps to transfer the oncoming container in each case as it moves from the upper runway to the lower, or from the lower runway to the upper runway.

Each of the carriers is bowl-shaped and is adapted to receive or hold a pan or other vessel such as is shown at 45 in Figure 3.

At the end of the table where the carrier moves from the upper runway to the lower runway I provide an elevator, which is shown in Figure 5, and which is used to keep the carrier from tilting. This elevator comprises a table 50 carried on a stem 51 which works up and down in the guide 52. On the lower end of the stem is provided a head 53, to which is attached a cable 54 which runs over a pulley 55. A weight 56 is provided on the lower end of the cable. The guide is carried on a bracket or cross bar 57, which is attached to the brace 9. When the carrier descends at the right hand end of the table 1, 1, it engages the table 50, which will at once keep it from tilting and will descend with it until it reaches the lower limit of its movement, after which the carrier will slide off the table and will release the table so that the table will be moved up by the weight 56.

On each end of each carrier at the bottom is provided a roller 60 which engages the floors 8 and 9 and serves to steady the position of the carrier as it moves.

For convenience, each carrier can be cut away on the ends, as indicated at 61, 61. This makes it easier to take hold of the pan carried therein for the purpose of removing it.

I claim:

1. In a food conveyer the combination of a table having table tops on each side thereof, two parallel runways between said table tops, a floor between said table tops, carriers supported between said table tops on said runways, mounts for said carriers extending transversely therefrom, said mounts having rollers thereon that engage with said runways and on which said carriers are adapted to swing by gravity, said carriers having wheels thereon that are adapted to engage with said floor and steady said carriers.

2. In a food conveyer the combination of a table having table tops on each side thereof, two parallel runways between said table tops, a floor between said table tops, carriers supported between said table tops on said runways, mounts for said carriers extending transversely therefrom, said mounts having rollers thereon that engage with said runways and on which said carriers are adapted to swing by gravity, said carriers having wheels thereon that are adapted to engage with said floor and steady said carriers, endless chains along said runways, rings on said chains adapted to engage with said carriers and cause them to move with the chains.

3. In a table adapted to be used for serving food, the combination of table tops, two parallel runways between said table tops, a floor between said table tops, carriers adapted to travel between said runways, said carriers having wheels thereon that are adapted to engage with said floor and steady said carriers, endless chains traveling along said runways, means thereon adapted to engage said carriers and move them with the chains.

4. In a table adapted to be used for serving food, the combination of table tops, two parallel tracks between said table tops, a floor between said table tops, carriers having trunnions thereon extending from either side thereof adapted to travel between said tracks, each trunnion having a roller thereon adapted to engage said tracks, said trunnions being placed above the center of gravity of the carrier so that the carrier swings therefrom by gravity, said carriers having wheels thereon that are adapted to engage with said floor and steady said carriers.

5. In a table adapted to be used for serving food, the combination of table tops, two parallel tracks between said table tops, a floor between said table tops, carriers having trunnions thereon extending from either side thereof adapted to travel between said tracks, each trunnion having a roller thereon adapted to engage said tracks, said trunnions being placed above the center of gravity of the carrier so that the carrier swings therefrom by gravity, said carriers having wheels thereon that are adapted to engage with said floor and steady said carriers, endless chains traveling along said runways, rings thereon adapted to engage with said trunnions and move the carriers with the chains.

6. In a table adapted to be used for serving food, the combination of table tops, two parallel tracks between said table tops, a floor between said table tops, carriers having trunnions thereon extending from either side thereof adapted to travel between said tracks, each trunnion having a roller thereon adapted to engage said tracks, said trunnions being placed above the center of gravity of the carrier so that the carrier swings therefrom by gravity, said carriers having wheels thereon that are adapted to engage with said floor and steady said carriers, endless chains traveling along said runways, rings thereon adapted to engage with said trunnions and move the carriers with the chains, sprocket wheels at each end of the runways carried on short shafts extending outwardly therefrom, leaving an open space between each pair of sprocket wheels, said carriers being adapted to travel down, around and between said sprocket wheels at one end of the runway, and travel up and around the sprocket wheels at the other end of the runway.

NICK BONANNO.